US007518324B2

(12) United States Patent
Nolan et al.

(10) Patent No.: US 7,518,324 B2
(45) Date of Patent: Apr. 14, 2009

(54) UNIVERSAL MOTOR SPEED CONTROLLER

(75) Inventors: Dennis C. Nolan, Elk Grove Village, IL (US); Blake Carpenter, Cleveland, TN (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 11/649,174

(22) Filed: Jan. 3, 2007

(65) Prior Publication Data

US 2007/0159122 A1 Jul. 12, 2007

Related U.S. Application Data

(60) Provisional application No. 60/756,970, filed on Jan. 6, 2006.

(51) Int. Cl.
*H02P 25/14* (2006.01)

(52) U.S. Cl. ....................... 318/245; 318/268; 318/599; 318/603

(58) Field of Classification Search ................. 318/245, 318/244, 163, 779, 257, 268, 599, 603
See application file for complete search history.

(56) References Cited

U.S. PATENT DOCUMENTS

| | | | | |
|---|---|---|---|---|
| 3,331,004 | A | 7/1967 | Brown | |
| 3,675,126 | A | 7/1972 | Chilton | |
| 4,527,101 | A | 7/1985 | Zavis et al. | |
| 4,574,226 | A | 3/1986 | Binder et al. | |
| 4,618,805 | A | 10/1986 | Hornung et al. | |
| 5,986,417 | A * | 11/1999 | Nicolai et al. | 318/245 |
| 6,243,532 | B1 * | 6/2001 | Wacker et al. | 388/811 |
| 6,759,822 | B2 * | 7/2004 | Marusarz | 318/268 |
| 6,806,677 | B2 * | 10/2004 | Kelly et al. | 318/767 |
| 2004/0135533 | A1 * | 7/2004 | Harakawa et al. | 318/609 |

FOREIGN PATENT DOCUMENTS

| | | |
|---|---|---|
| EP | 0 741 450 | 11/1996 |
| GB | 2 160 338 | 12/1985 |

OTHER PUBLICATIONS

European Search Report, EP 07 25 0049, dated May 30, 2007.

* cited by examiner

*Primary Examiner*—Bentsu Ro
*Assistant Examiner*—David S Luo
(74) *Attorney, Agent, or Firm*—Lisa K. Jorgenson; Andre M. Szuwalski

(57) ABSTRACT

Moderately accurate closed loop speed control of a universal motor is attained without the need for any type of speed sensor. Motor armature (across the brushes) voltage is sensed and supplied to a control circuit for processing along with sensed motor current and zero-crossing information. Integration of the motor armature voltage provides a value which is related to current motor speed. By adjusting the gating angle for triac actuation, the armature voltage integral can be maintained at a desired value associated with a desired motor speed. The sensed motor current is also integrated to provide a speed droop compensation value that is added to the desired value, and the gating angle for triac actuation is adjusted to move the armature voltage integral value to approach the summed value of the speed droop compensation value and desired value.

12 Claims, 2 Drawing Sheets

UNIVERSAL MOTOR SPEED CONTROLLER

PRIORITY CLAIM

The present application claims the benefit of U.S. Provisional Application for Patent No. 60/756,970 filed Jan. 6, 2006, the disclosure of which is hereby incorporated by reference.

BACKGROUND OF THE INVENTION

1. Technical Field of the Invention

The present invention relates to universal motors and, in particular, to a speed controller for a universal motor subject to varying torque loads.

2. Description of Related Art

Universal motors are used in a wide variety of applications because of their low cost and versatility. It is difficult, however, to control the speed of a universal motor when presented with varying torque loads.

Usually, a speed sensor is attached to the motor to provide feedback to some sort of closed loop control circuitry. While this has been done in the past, the additional cost of the sensor and installation on the motor somewhat negate the low cost advantage of the universal motor.

Prior art speed controllers are shown in U.S. Pat. Nos. 4,527,101 and 5,986,417, the disclosures of which are hereby incorporated by reference.

SUMMARY OF THE INVENTION

In an embodiment, a speed control circuit for a universal motor having an armature comprises a voltage sensor for sensing a voltage across the armature of the universal motor, a switch for controlling application of current to the universal motor in response to a control signal, and a circuit that compares the sensed voltage with a reference voltage associated with a desired motor speed. The circuit adjusts the control signal to minimize a difference between the sensed voltage and reference voltage to control operation of the universal motor at about the desired speed.

The speed control circuit further comprises a current sensor for sensing a current passing through the universal motor. The circuit calculates a compensation voltage from the sensed current and compares the sensed voltage with the sum of the reference voltage and the compensation voltage. The circuit adjusts the control signal to minimize a difference between the sensed voltage and the sum of the reference voltage and compensation voltage to control operation of the universal motor at about the desired speed.

In an embodiment, a method for controlling the speed of a universal motor having an armature comprises measuring a voltage value across the armature which represents a current speed of the motor, measuring a current through the motor which represents a presence of torque load on the motor, calculating a compensation voltage from the measured current, comparing the measured voltage value to a compensated armature voltage target which comprises the sum of the compensation voltage and a reference voltage associated with a desired motor speed, and adjusting the measured voltage to approach the compensated armature voltage target.

In an embodiment, a method for controlling the speed of a universal motor having an armature comprises measuring a voltage value across the armature which represents a current speed of the motor, comparing the measured voltage value to a reference armature voltage associated with a desired motor speed, and adjusting the measured voltage to approach the reference armature voltage.

In an embodiment, a motor system comprises a universal motor having an armature, a voltage sensor coupled to the motor to measure voltage across the armature, a switch that selectively applies voltage to the universal motor, and a control circuit connected to control the switch and receive an output of the voltage sensor. The control circuit compares the measured voltage across the armature to an armature reference voltage associated with a desired motor speed and controls the switch in dependence on the comparison to adjust the measured voltage across the armature to approach the armature reference voltage.

The motor system further comprises a current sensor coupled to measure current passing through the motor. The control circuit compares the measured voltage across the armature to a target armature voltage comprising the sum of a compensation voltage derived from the measured current and the armature reference voltage and controls the switch in dependence on the caparison to adjust the measured voltage across the armature to approach the target armature voltage.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
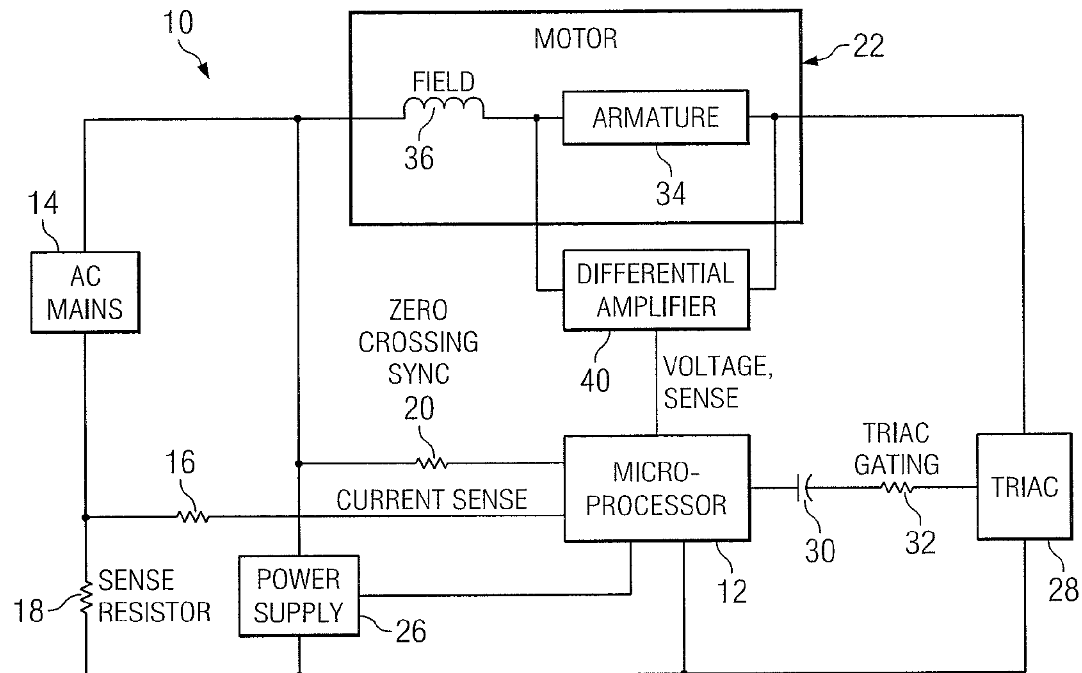
FIG. 1 is a block diagram of a speed controller system in accordance with an embodiment of the present invention.

Reference is made to FIG. 1 wherein there is shown a block diagram of a speed controller system 10 in accordance with an embodiment of the present invention. The system 10 comprises a microprocessor 12 which is connected to the AC mains 14 (which supply the AC power for motor 22 operation) through a set of resistors 16, 18 and 20 so that motor current may be sensed and timing of the microprocessor 12 may be synchronized with zero crossings the voltage on the AC mains 14. More specifically, a first node of the AC mains is connected to a first terminal of the motor 22 and a second node of the AC mains is connected to a first end of each of resistors 16 and 18. A second end of resistor 16 is connected to a first input port of the microprocessor 12 and provides a CURRENT SENSE signal which is input to and received by the microprocessor 12. A second end of resistor 18 is connected to ground (common) 24. The microprocessor 12 is also connected to ground 24. A first end of resistor 20 is connected to the first node of the AC mains 14. A second end of resistor 20 is connected to a second input port of the microprocessor 12 and provides a ZERO-CROSSING SYNC signal which is input to and received by the microprocessor 12.

The first node of the AC mains 14 is further connected to a power supply circuit 26 which is also connected to ground 24. An output of the power supply circuit 26 supplies operating DC power to the microprocessor 12.

The microprocessor 12 includes an output port that is coupled to the gate of a TRIAC 28 through a capacitor 30 and resistor 32. The output port generates, under microprocessor 12 control, a TRIAC GATING signal for application to the TRIAC 28 gate terminal. The microprocessor 12 controls the generation of the TRIAC GATING signal so that gating pulses are applied in a manner synchronized to the AC mains 14 with variable delay with respect to the mains zero crossing (as detected through the ZERO-CROSSING SYNC signal). The variable delay of the TRIAC GATING signal is related to setting the motor 22 speed in a manner known to those skilled in the art.

The conduction terminals of the TRIAC 28 are connected to a second terminal of the motor 22 and to ground 24. In this way, the TRIAC 28 is connected in series with the AC mains 14, the universal motor 22 and sensing resistor 18. The motor comprises an armature 34 and field coils 36 in conventional series configuration. The series connection of the TRIAC 28 in the manner described above allows switching of the TRIAC to control the power applied to the motor 22.

The microprocessor 12 is connected to the current sensing resistor 18 via the first input port and an associated analog-to-digital converter (ADC—not shown) so that current flowing in the TRIAC (and motor) can be measured by the microprocessor 12. The microprocessor 12 is also connected to the output of a differential amplifier 40 via a third input port and another ADC (not shown). The inputs to the differential amplifier 40 are connected across the armature (brushes) 34 of the universal motor 22 so that the voltage across the armature can be measured.

The fundamental method that has been used in the prior art to control the motor speed is to vary the timing of the TRIAC 28 gating signal (trigger). The trigger is applied once in each half cycle after a time delay measured from each sensed zero crossing of the AC mains 14. This time is called the gating delay and is measured over a range of 0 to 180 degrees where 0 represents gating immediately at the zero crossing and 180 represents a full half line cycle delay. A gating delay of 180 degrees applies zero power to the motor and results in zero speed. In general, as the gating delay is decreased the motor speed will increase, with the maximum speed attained at a gating delay of zero. While this technique has been used successfully in many systems it suffers from a major problem: for a given gating angle, even a moderate change in the motor torque loading results in a large change in motor speed.

It has been found that if the voltage across the motor armature is monitored by the microprocessor (using the differential amplifier 40) and numerically integrated by the microprocessor 12 (specifically over the interval during which current is flowing in the motor; i.e., from when the gating signal is applied until current falls to zero), then the value derived from that integration has a relationship to motor speed which is much more linear than that which is recognized in the prior art to exist between gating angle and speed. In an embodiment of the invention, a regulator is constructed using the microprocessor 12 to monitor the result of the armature voltage integration and maintain that result at any desired value by having the microprocessor 12 adjust the gating angle (of the TRIAC GATING signal) in order to have the voltage integration value approach, if not match, the desired value. In general, decreasing the gating angle will increase the armature voltage integral. This regulator operates to compare the sensed armature voltage with a reference armature voltage associated with a desired (or target) motor speed, and adjust the triac gating angle so as to minimize a difference between the sensed armature voltage and reference armature voltage, thus controlling operation of the universal motor at about the desired speed.

Once armature voltage regulation has been established, the proper armature voltage value that should be regulated (an armature voltage reference) to attain any desired speed can be established experimentally. Thus, the microprocessor may store a table relating each speed point over a range of desired speeds to a certain armature voltage reference. The microprocessor then adjusts the gating angle of the TRIAC GATING signal until the sensed armature voltage matches the stored armature voltage reference associated with the desired motor speed.

While the use of armature voltage regulation in the presence of motor torque load variations will maintain constant speed with better accuracy than relying on a fixed gating angle, the motor speed will still reduce (speed droop) with increasing load torque. In other words, as torque on the motor increases, the speed decreases. It has been found that, at any given speed, as motor load torque is increased the armature voltage integral will increase owing to an additional voltage term which is proportional to the magnitude of additional motor current (to support the increased load) which is flowing. Thus, to maintain speed in the presence of increased torque (i.e., to stay at the desired or target speed), the gating angle must be changed and the sensed armature voltage will increase in response thereto. The magnitude of the voltage term can be estimated by having the microprocessor 12 numerically integrate the motor current (as sensed by resistor 18) over the conduction angle (same time interval as was used for the armature voltage integration) and multiply the integrated motor current value by an experimentally determined scaling constant. This value provides a compensation term. If this determined compensation term is then added to the armature voltage reference (i.e., the proper armature voltage value that should be regulated), a target compensated armature voltage is obtained. The speed droop that is experienced as a result of increasing motor torque load can then be very significantly reduced by evaluating the armature voltage integral in comparison to the target compensated armature voltage. More specifically, the regulator further compares the sum of the compensation term and armature voltage reference against the sensed integrated armature voltage and adjusts the gating angle to minimize the difference.

The operation of the present invention may be better understood by considering the following: Assume a constant level of field flux in the motor 22 (as will be the case if the motor current is above the saturation level of the field magnetic circuit). In this situation, the motor back electromotive force (BEMF) voltage which is generated at the motor armature (brushes) 34 will be directly proportional to motor speed. The constant of proportionality for the motor is usually denoted Kv and often expressed in units of Volts/RPM. The motor armature winding also has an electrical resistance usually denoted R and is expressed in Ohms (or Volts/Amp). If we denote the measured armature voltage as V (Volts), the motor current as I (Amps) and the motor speed as W (RPM), then we have: $V=Kv*W+R*I$. If one knows the speed (W) desired, knows the resistance (R, which is a constant for a given motor) and knows I (the motor current value which is constantly being measured by the microprocessor 12 through the current sending operation) then V, which is the expected armature voltage under such conditions, can be calculated. The microprocessor 12 functions to regulate by adjusting the triac 28 gating angle so as to achieve this voltage V. By continually measuring the voltage V using the differential amplifier 40, the microprocessor can continuously make adjustments to the triac 28 gating angle which will assure operation of the motor at the desired speed.

In view of the foregoing, the following process flow is implemented by the microprocessor: first, wait for the triac to be gated. Triac gating is under the control of the microprocessor so timing is easily monitored. The gating angle is set to achieve a desired speed, wherein that desired speed has an associated previously known armature reference voltage.

Next, after gating and while current still flows through the motor (i.e., during the conduction angle), measure and integrate the sensed armature voltage and the sensed loop current. Then, multiply the current integral by a constant (related to resistance) to yield voltage compensation value. The voltage compensation is then added to the known armature reference voltage (for the desired speed) to yield a compensated armature voltage target. Next, calculate regulator error by determining a difference between the armature voltage target and the sensed armature voltage integral. Next, perform a regulator calculation to calculate a new gating angle for the triac so as to minimize the calculated regulator error. Then, loop back and repeat the process for a next TRIAC gating period.

Figure 2:
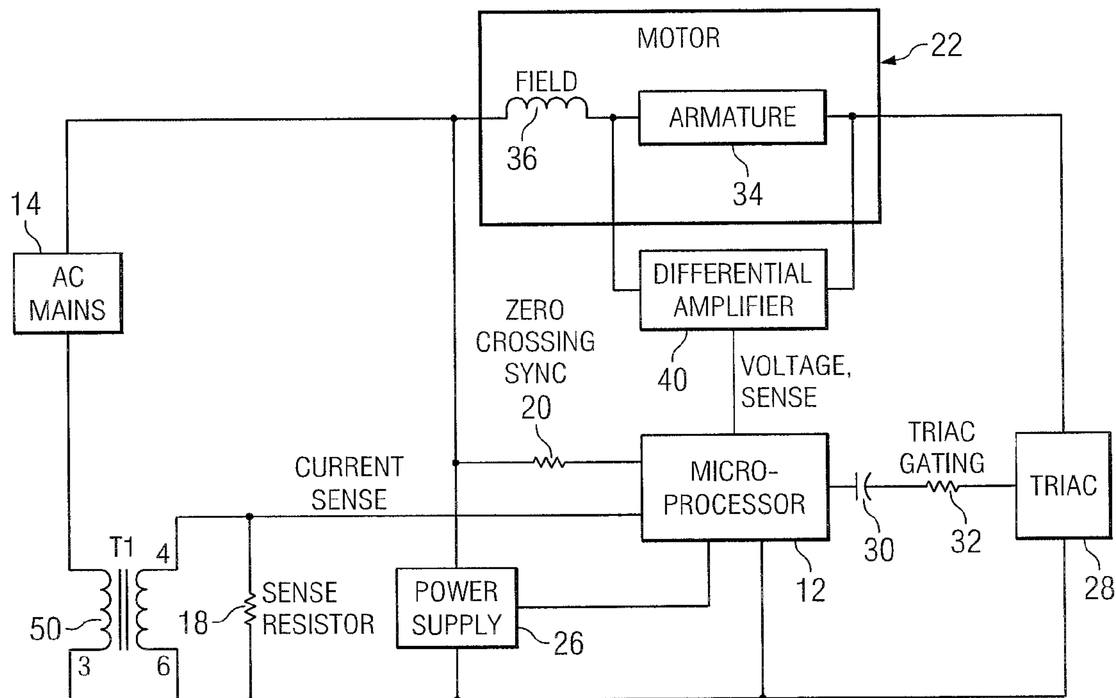
FIGS. 2 and 3 illustrate alternatives for obtaining a motor current value.
Figure 3:
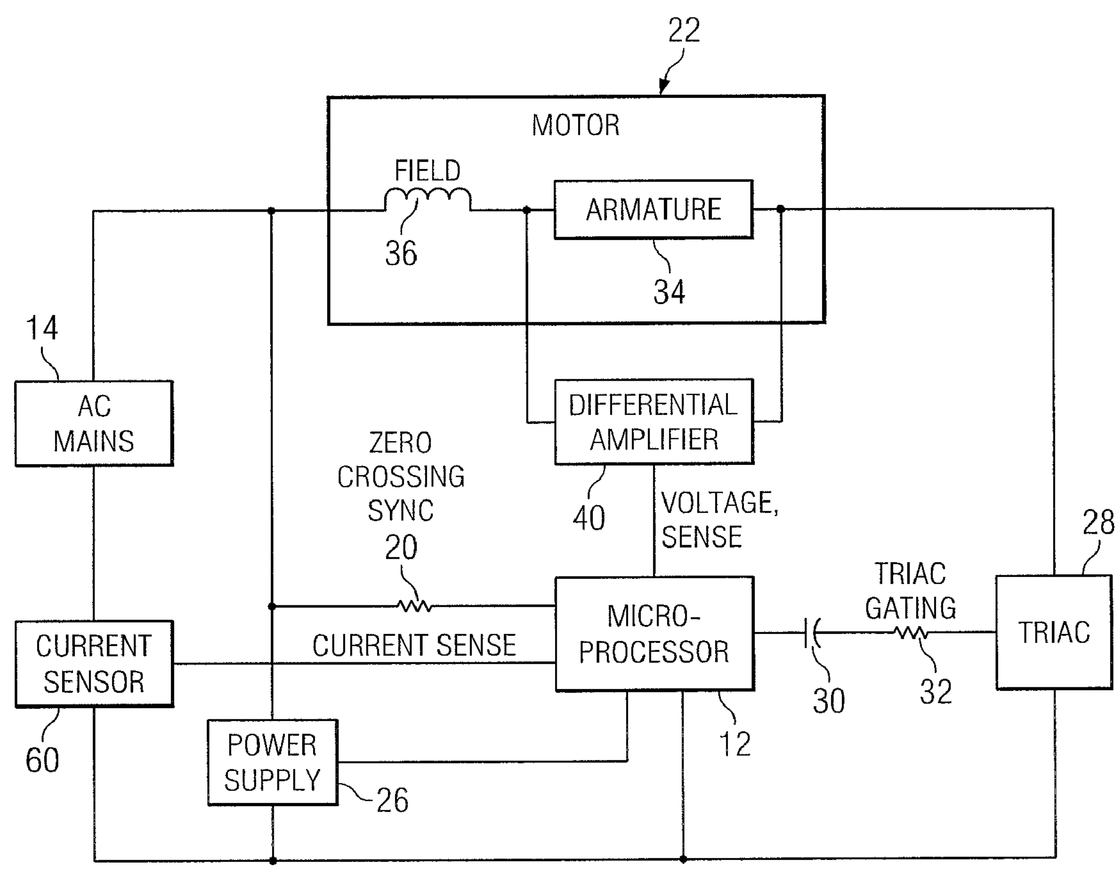

With reference now to FIGS. 2 and 3, several alternatives to FIG. 1 are envisioned for obtaining the motor current signal. In FIG. 2, an AC current transformer 50 is used as a current sensing device. In FIG. 3, a HALL current sensor 60 is provided.

With respect to the use of the AC current transformer 50 in FIG. 2, when an AC current flows in the primary of the current transformer 50, a current will be forced to flow in the secondary that is in direct proportion to the primary current. The constant of proportionality is determined by the ratio of wire turns in the primary to wire turns in the secondary. One terminal of the secondary is connected to the control circuit ground reference 24 and the other terminal is returned to that same reference point through a precision resistance 18. This circuitry converts the known current in the secondary to a proportional voltage that can be easily read by an analog to digital converter of the microprocessor 12. The primary winding of the current transformer 50 carries the overall circuit current being measured.

With respect to the use of the Hall sensor 60 in FIG. 3, a voltage output Hall current sensor 60 is similar to a current transformed, although in can operate all the way down to DC while the current transformer has a low frequency cutoff. A primary winding of one or more turns is placed on a magnetic core (as is the case with a current transformed), which causes a magnetic flux to flow in the core, proportional to the primary current. The core usually contains an air gap and a Hall sensor is inserted into the gap. A Hall sensor is a semiconductor device that, when properly biased, will generate an output voltage which is proportional to the strength of the magnetic field in which it is placed. Since the field strength is proportional to the primary current, the voltage generated will be proportional to the current and can be read by the analog to digital converter of the microprocessor 12.

Referring now to FIGS. 1-3, while a microprocessor 12 is shown for processing the sensed armature voltage and outputting the TRIAC GATING gating signal based thereon (as well as in view of the zero-crossing input and sensed current), it will be understood that the microprocessor may be replaced with any suitably designed circuit that is capable of use to make the necessary signal processing operation(s) and generate the necessary control signal(s). For example, an analog circuit with digital logic could be used in place of the microprocessor. Also, alternative fully digital solutions other than microprocessors, such as microcontrollers, digital signal processors, digital logic devices, application specific integrated circuits, and the like could be implemented.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A speed control circuit for a universal motor having an armature, comprising:

a voltage sensor for sensing a voltage across the armature of the universal motor;

a switch for controlling application of power to the universal motor in response to a control signal;

a current sensor for sensing a current passing through the universal motor; and a processing circuit for integrating the sensed voltage over a period of time in which the switch is being controlled to apply power to the universal motor, the processing circuit calculating a compensation voltage from the sensed current and comparing the integrated voltage with a sum of a reference voltage and the compensation voltage, and adjusting the control signal to minimize a difference between the integrated voltage and the sum of the reference voltage and compensation voltage.

2. The speed control circuit of claim 1 wherein the switch is a triac and the control signal is a triac gating signal having a gating angle, and wherein the gating angle is adjusted by the processing circuit so as to minimize the difference between the integrated voltage and the sum of the reference voltage and compensation voltage.

3. The speed control circuit of claim 1 wherein the processing circuit integrates the sensed current over a time period within which the switch is being controlled to apply power to the universal motor.

4. A method for controlling the speed of a universal motor having an armature, comprising:

sensing a voltage across the armature of the universal motor;

integrating the sensed voltage over a period of time in which a switch is controlled to apply power to the universal motor;

controlling the application of power to the universal motor in response to a control signal;

sensing a current passing through the universal motor;

calculating a compensation voltage from the sensed current;

comparing the integrated voltage with the sum of a reference voltage and the compensation voltage, and adjusting the control signal to minimize a difference between the integrated voltage and the sum of the reference voltage and compensation voltage.

5. The method of claim 4 wherein adjusting comprises adjusting a gating angle of a triac switch so as to minimize the difference between the integrated voltage and the sum of the reference voltage and compensation voltage.

6. The method of claim 4 wherein sensing the current comprises integrating the sensed current over a time period within which the switch is being controlled to apply power to the universal motor.

7. A method for controlling the speed of a universal motor having an armature, comprising:

measuring a voltage across the armature;

integrating the measured voltage over a period of time in which a switch is controlled to apply power to the motor;

measuring a current through the motor;

calculating a compensation voltage from the measured current;

calculating a compensated armature voltage target from the compensation voltage and a reference voltage associated with a desired motor speed;

comparing the integrated voltage to the compensated armature voltage target; and adjusting a gating angle of the switch so as to minimize the difference between the integrated voltage and the compensated armature voltage target.

8. The method of claim 7, further comprising:

controlling application of power to the universal motor in response to a control signal;

wherein adjusting the gating angle comprises adjusting the control signal to minimize a difference between the integrated voltage and the compensated armature voltage target to control operation of the universal motor at about the desired motor speed.

9. A method for controlling the speed of a universal motor having an armature, comprising:

measuring a voltage across the armature;

integrating the measured voltage over a conduction period of a switch configured to apply power to the motor;

measuring a current through the motor;

integrating the measured current over the conduction period of the switch;

calculating a compensation voltage from the integrated current;

calculating a compensated armature voltage target from the compensation voltage and a reference voltage associated with a desired motor speed;

comparing the integrated voltage to the a compensated armature voltage target; and adjusting a gating angle of the switch to minimize the difference between the integrated voltage and the compensated armature voltage target.

10. The method of claim 9, further comprising:

controlling application of power to the universal motor in response to a control signal;

wherein adjusting comprises adjusting the control signal to minimize a difference between the integrated voltage and the compensated armature voltage target to control operation of the universal motor at about the desired motor speed.

11. A motor system, comprising:

a universal motor having an armature;

a voltage sensor coupled to the motor to measure voltage across the armature;

a current sensor for measuring the current flowing through the motor;

a switch that selectively applies voltage to the universal motor;

a control circuit for integrating the measured voltage and the measured current over a conduction period of the switch, the control circuit calculating a compensation voltage from the integrated current and a compensated armature voltage target from the compensation voltage and a reference voltage associated with a desired motor speed, the control circuit adjusting a gating angle of the switch to minimize the difference between the integrated voltage and the compensated armature voltage target.

12. The system of claim 11 wherein the switch is a triac responsive to a triac gating signal having the gating angle.

* * * * *